United States Patent [19]

Riis

[11] 4,304,358

[45] Dec. 8, 1981

[54] THERMOSTATIC MIXING VALVE

[75] Inventor: Voldemar Riis, Vårgårda, Sweden

[73] Assignee: AB Vårgårda Armaturfabrik, Vårgårda, Sweden

[21] Appl. No.: 170,676

[22] PCT Filed: Feb. 21, 1979

[86] PCT No.: PCT/SE79/00038

§ 371 Date: Nov. 3, 1979

§ 102(e) Date: Oct. 25, 1979

[87] PCT Pub. No.: WO79/00697

PCT Pub. Date: Sep. 20, 1979

[30] Foreign Application Priority Data

Mar. 3, 1978 [SE] Sweden ................................ 7802423

[51] Int. Cl.³ ........................................ G05D 23/13
[52] U.S. Cl. ........................................ 236/12 R; 137/605
[58] Field of Search ............... 236/12.16, 12.2, 12.21, 236/12.22, 93 A; 137/605, 625.4

[56] References Cited

U.S. PATENT DOCUMENTS

| 796,576 | 8/1905 | Graham | 132/605 |
| 2,758,792 | 8/1956 | Rice et al. | 236/12.21 X |
| 3,228,603 | 1/1966 | Norman | 236/12.2 |
| 3,273,796 | 9/1966 | Bauerlein | 236/93 A X |
| 3,685,728 | 8/1972 | Chapou | 236/12.2 |
| 3,792,812 | 2/1974 | Knapp | 236/12.2 |
| 3,955,759 | 5/1976 | Knapp | 236/12.2 |
| 4,195,774 | 4/1980 | Warner | 137/625.4 X |

Primary Examiner—William E. Tapolcai, Jr
Attorney, Agent, or Firm—Holman & Stern

[57] ABSTRACT

A thermostatic mixing valve is provided comprising a thermostat body arranged in an elongated housing and actuating an axially displaceable control member, which regulates the inlet areas for the warm and cold water. The control member cooperates with a sleeve member for regulating one of the inlet areas. The sleeve member is axially displaceable in the housing by the pressure from one of the liquids and this movement is limited by a stop ring. The end of the sleeve member remote from the control member cooperates with an axially displaceable closing sleeve regulating the outlet area of the mixed water. Pressure means actuated by an actuating lever acts upon the closing sleeve by pivoting said lever about an axle perpendicular to the housing. The mixed water temperature being regulated by rotating said lever, at which means being arranged to axially displace the thermostat body.

8 Claims, 1 Drawing Figure

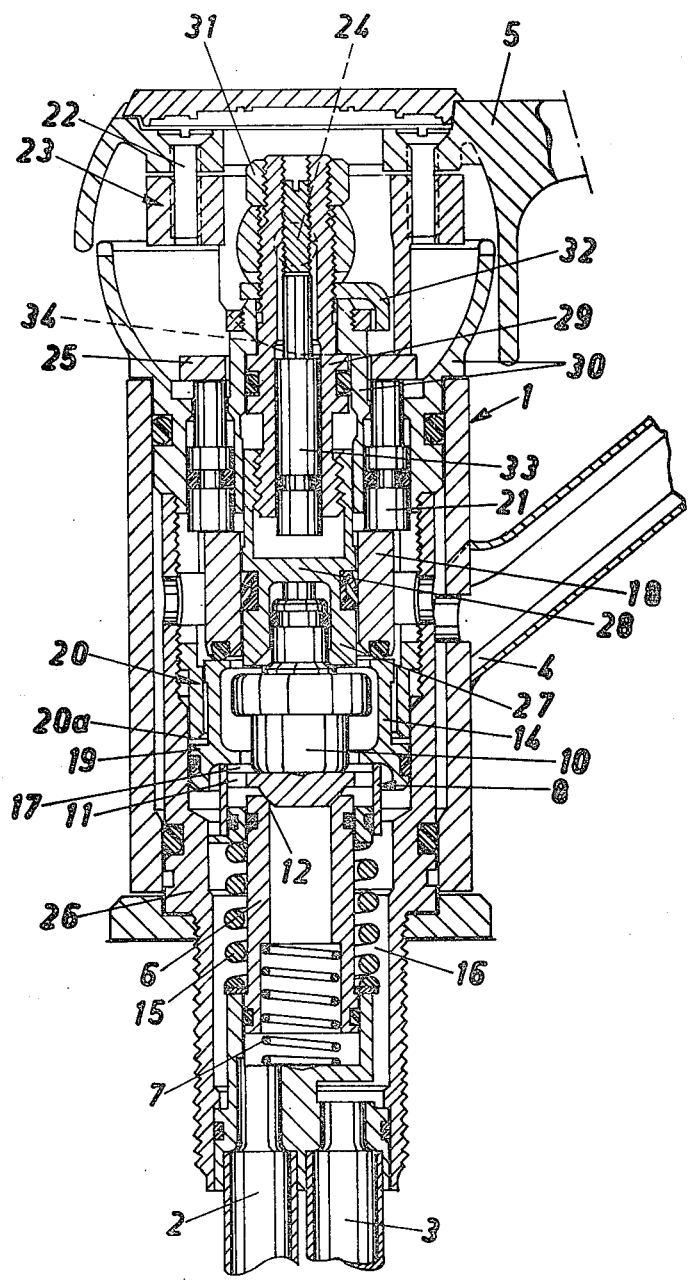

THERMOSTATIC MIXING VALVE

BACKGROUND OF THE INVENTION

The present invention relates to a thermostatic mixing valve for two liquids, e.g. warm and cold water, and comprising an elongated housing provided with an outlet and an inlet for each of the liquids, an actuating member for adjusting the outflow and the temperature of the mixed liquid, a thermostat body sensing the temperature of the mixed liquid, said thermostat body being arranged to cooperate with a control member being axially displaceable in the housing for regulating the inlet areas of the liquids, a feed pipe extending axially in the housing being arranged for the first liquid, the end of the feed pipe remote from the inlet having a seat for the control member for regulating the inlet area of the first liquid, and a sleeve member, which with one end forms a seat for the control member for regulating the inlet area of the second liquid flowing through a passage surrounding said feed pipe, and with its opposite end is arranged to cooperate with a closing sleeve, which is axially displaceable in the housing and which regulates the outlet area of the mixed liquid.

A thermostatic mixing valve of a similar type is described in the U.S. Pat. No. 3,685,728. This mixing valve is however provided with two separate actuating members, which have to be rotated separately for adjusting the outflow and the temperature resp. of the mixed liquid. Besides that a considerable liquid volume is housed between the regulation slots and the thermostat body, thus causing a long reaction time for the mixing valve at a change of pressure or temperature in the water pipe system. The outflow actuating member only closes the outlet, so that separate non-return valves have to be mounted in the inlet pipes in order to avoid a passage of liquid between the pipes when a negative pressure arises in any of them.

In the German Offenlegungsschrift 2.433.459 is also described a thermostatic mixing valve with two separate actuating members, which have to be rotated separately for adjusting the outflow and the temperature resp. of the mixed liquid. Also in this mixing valve a considerable liquid volume is housed between the regulation slots and the temperature responsive element and separate non-return valves have to be mounted in the feed pipes in order to avoid a passage of liquid between them.

SUMMARY OF THE INVENTION

The purpose of the invention is to provide a thermostatic mixing valve having a more compact and less space requiring design than the majority of the present available thermostatic mixing valves, which generally are big and bulky. The mixing valve shall be of "one-grip" type, i.e. the same actuating member shall be used both for temperature and outflow adjustment and the manipulation of the actuating member shall be simple. Besides the construction shall have a non-return valve function, so that there can be no passage between the inlet pipes when a negative pressure arises in one of the inlet pipes e.g. owing to a big discharge from the pipe or a break of the pipe. No separate non-return valves shall be needed in the inlet pipes.

According to the invention a thermostatic mixing valve is provided, in which the above mentioned problems are solved and which is characterized thereby that said sleeve member is limitedly axially displaceable in the housing, by the pressure from the second liquid against a stop member, and with the actuating member in a closed position, the closing sleeve and the sleeve member on one hand and the sleeve member and the control member on the other hand being brought to sealingly contact each other and the control member against the action of a spring being brought to sealingly contact the seat of the feed pipe.

BRIEF DESCRIPTION OF THE DRAWING

The invention will now be further described with reference to the accompanying drawing showing an embodiment.

The drawing is a vertical section through a mixing valve according to the invention.

DESCRIPTION OF A PREFERRED EMBODIMENT

The thermostatic mixing valve comprises an elongated housing 1, at one end of which inlets 2 and 3 for warm and cold water resp. are arranged and at the central part of which an outlet 4 for mixed tempered water is arranged. The outflow of the mixed water is controlled by an actuating lever 5 arranged at the end of the housing 1 remote from the inlets 2 and 3.

One of the media, e.g. the warm water, flows from the inlet channel 2 through a centrally arranged feed pipe 6, which is springingly mounted in the axial direction. The end of the feed pipe 6 remote from the inlet 2 is arranged in a control member 8 and has a seat 12, with which the control member 8 cooperates for regulating the delivery of warm water. The control member 8 is arranged just before a thermostat body 10 and is provided with a number of circularly placed openings 11 for the warm water and is arranged to control the delivery of cold water by increasing or decreasing a slot between the upper edge of the control member 8 and the lower end of a sleeve member 14 arranged above the control member 8 and surrounding the thermostat body 10. The control member 8 is by a spring 15 pressed upwards.

The cold water flows from the inlet channel 3 through a passage 16 surrounding the feed pipe 6 and through the slot between the upper edge of the control member 8 and the lower end of the sleeve member 14. The warm water flows through the slot between the seat 12 and the control member 8 and through the openings 11 in the control member 8. The cold and warm water is mixed after the passage through the slot between the control member 8 and the sleeve member 14 and the openings 11 resp. The thermostat body 10 contacts the control member 8 and controls the position of the control member and thus the relation between the inflow areas for the warm and cold water.

The mixed water flows around the thermostat body 10 and through a passage between the upper end of the sleeve member 14 and a closing sleeve 18 arranged above the sleeve member 14 and out through the outlet 4.

The sleeve member can make a limited axial movement between the upper edge of the control member 8 and a stop collar 20 arranged outside the sleeve member 14, an outer shoulder 19 on the sleeve member 14 being intended to abut said stop collar 20. The closing sleeve 18 is axially displaceable in the housing 1 and is actuated by a pair of diametrically opposed arranged pistons 21, contacting the upper end of the closing sleeve 18.

A yoke 23, which by means of screws 22 is connected to the actuating lever 5, is pivoted about an axle 24 arranged across the axial direction of the housing 1. The bottom part of the yoke 23 is curveshaped and by pivoting the yoke 23 about the axle 24 the curve 34 actuates a pressure ring 25 arranged on the pistons 21 and presses this together with the pistons 21 downwards. The pressure ring 25 is arranged about a circular inner portion of a top piece 30, which will be closer described below, said top piece 30 guiding the pressure ring 25, so that this only can make an axial movement.

The piston 21 presses the closing sleeve 18 downwards against the sleeve member 14, which moves downwards and closes the cold water passage between the sleeve member 14 and the control member 8. At the same time the control member 8 is pressed downwards against the action of the spring 15 and closes the warm water passage between the seat 12 and the control member 8. Since not only the outlet passage but also the inlet passages for the warm and cold water are closed when bringing the lever 5 to a closed position, there can be no passage between the inlet pipes, if a negative pressure would arise in any of them. Therefore separate non-return valves in the inlet pipes 2 and 3 are unnecessary.

When opening the water supply in the mixing valve the lever 5 is pivoted upwards, at which the pressure from the curve shaped bottom part of the yoke upon the pressure ring 25 and the pistons 21 is discontinued. By the water pressure the sleeve member 14 is then lifted, so that the shoulder 19 contacts the lower edge 20a of the stop collar 20. The control member is by the spring 15 moved upwards a distance corresponding to the position of the thermostat body, which is determined by the setted temperature, at which warm and cold water can flow into the mixing chamber 17. The closing sleeve 18 is lifted by the water pressure, since no pressure is longer exerted upon it from the pistons 21, and the passage out through the outlet 4 is free. The maximum outflow is determined by the position of the stop collar 20, which is provided with external threads and screwed into an outer sleeve 26 extending all the way down to the inlets 2 and 3. The cold water passage 16 is defined by the outer sleeve 26 and the feed pipe 6.

The thermostat body 10 contacts with one end surface the control member 8 and its opposite end is received in a bush 27, which by means of a partition wall 28 prevents the thermostat body to move upwards. The bush 27 is arranged inside the closing sleeve 18 and is axially displaceable in relation to this. The bush 27 is at its upper part provided with internal threads for threaded engagement with the lower part of a spindle 29. The upper part of the bush 27 is received in a central through opening 30 in the top piece 30, which also is provided with two diametrically opposed holes for the pistons 4. The bush 27 and the top piece 30 are unrotatably connected with each other, the bush 27 having a non-circular cross-section corresponding to a non-circular cross-section of the top piece 30. Thus an axial displacement between the bush 27 and the top piece 30 can be performed.

The top piece 30 is with its lower part screwed into the outer sleeve 26 and has an upper bowl-shaped portion, in which the pressure ring 25 and the yoke 23 are received. The spindle 29 projects above the opening in the top piece 30 and is on this projecting portion provided with external axial flutes corresponding to internal flutes of an opening extending across the pivot axle 24. Thus the spindle 29 is unrotatably connected with the pivot axle 24 and with the yoke 23.

When the actuating lever 5 is rotated about a vertical axle the rotational movement is transferred to the spindle 29, which is screwed into or out of the bush 27 thus displacing this downwards or upwards resp., since an axial displacement of the spindle 29 is prevented. The spindle 29 has above its fluted portion a threaded portion, on which a nut 31 is screwed, which keeps the pivot axle 24 in place. A stop lug 32 unrotatably connected with the spindle 29 limits the rotational movement of the spindle.

A check screw 33 is threaded into the spindle 29, said check screw 33 with its lower end projecting somewhat out of the spindle 29 and limiting the upward movement of the bush 27 by abutting the partition wall 28 of the bush 27. The position of the check screw 33 is adjustable by a screw driver slot at its upper end and in this way a desired maximum temperature can be set, which cannot be exceeded.

When setting a desired temperature the lever 5 is rotated about a vertical axle and brings with the yoke 23 and the spindle 29, which is screwed into or out of the bush 27 thus forcing the bush 27 upwards or downwards resp. The bush 27 actuates the thermostat body 10, which cooperates with the control member 8 and thus provides a changed relation between the inlet areas for warm and cold water.

If the temperature of the mixed water exceeds the set temperature the thermostat body 10 is expanded in the axial direction, thereby forcing the control member 8 downwards, at which the inlet area for the cold water is increased and the inlet area of the warm water is decreased, and the desired temperature is again obtained. It is appreciated that the reaction time is very short, since the regulation slots for both the warm and cold water are located very close to the thermostat body 10, at which the volume between the sensing surface of the thermostat body 10 and the regulation slots is small. This volume is adapted for the maximum flow.

If the temperature of the mixed water decreases below the set temperature the thermostat body 10 is contracted in the axial direction, at which the control member 8 by the spring 15 is pressed upwards thus increasing the inlet area of the warm water and decreasing the inlet area of the cold water until the desired temperature is obtained.

It should be noted that when the temperature of the warm water is changed the supply of warm and cold water is simultaneously changed. The temperature compensation for the mixing valve, i.e. change of temperature when the warm water temperature is changed, is about 0.25° C./10° C. change of the warm water temperature. The corresponding figure for other available mixing valves is about 1.8°–4° C./10° C.

The invention is of course not limited to the embodiment shown and described but can be varied within the scope of the claims.

What I claim is:

1. A thermostatic mixing valve for two liquids, e.g. warm and cold water, and comprising an elongated housing provided with an outlet and an inlet for each of the liquids, an actuating member for adjusting the outflow and the temperature of the mixed liquid, a thermostat body sensing the temperature of the mixed liquid, a control member said thermostat body being arranged to cooperate with said control member being axially displaceable in the housing for regulating the inlet areas of the liquids, a feed pipe extending axially in the housing being arranged for the first liquid, the end of the feed pipe remote from the inlet having a seat for the control member for regulating the inlet area of the first liquid, a closing sleeve and a sleeve member, which with one end forms a seat for the control member for regulating the inlet area of the second liquid flowing through a passage surrounding said feed pipe and with its opposite end is arranged to cooperate with said closing sleeve, which is axially displaceable in the housing and which regulates the outlet area of the mixed liquid, wherein said sleeve member is limitedly axially displaceable in the housing by the pressure from the second liquid against a stop member, and with the actuating member in a closed position the closing sleeve and the sleeve member on one hand and the sleeve member and the control member on the other hand being brought to sealingly contact each other and the control member against the action of a spring being brought to sealingly contact the seat of the feed pipe.

2. A mixing valve as claimed in claim 1, wherein the position of said stop member is adjustable for regulating the maximum outflow.

3. A mixing valve as claimed in claim 1 or 2, wherein pressure means axially displaceable in the housing are arranged to act upon the closing sleeve, said pressure means cooperating with the actuating member and are actuated by this by pivoting said actuating member about an axle extending across the axial direction of the housing.

4. A mixing valve as claimed in claim 3, wherein said pressure means comprises a pair of pistons arranged diametrically opposed in the housing, a pressure ring being arranged on the pistons, a yoke which is fixed to the actuating member is provided with a curve shaped portion actuating said pressure ring when pivoting the actuating member about the axle.

5. A mixing valve as claimed in claim 4, wherein the pressure ring is arranged about a circular inner portion of a top piece guiding the movement of the pressure ring.

6. A mixing valve as claimed in claim 1, wherein, for setting the temperature, a bush is arranged, in which the upper end of the thermostat body is received and which limits the upward movement of the thermostat body, said bush being axially and unrotatably displaceable in the closing sleeve and at its upper part being provided with internal threads, for threaded engagement with a spindle, which is unrotatably connected with the actuating member.

7. A mixing valve as claimed in claim 6, wherein a check screw is arranged in the spindle, the lower end of the check screw projecting below the spindle and limits the upward movement of the bush and thus determines the maximum temperature of the mixed water which can be set, the position of the check screw in the spindle being adjustable.

8. A mixing valve as claimed in claim 6, wherein the control member, the sleeve member, the closing sleeve, the bush, the spindle and the feed passages for the two liquids are arranged about a common central axis through the housing.

* * * * *